United States Patent [19]

Hintz et al.

[11] Patent Number: 4,638,508
[45] Date of Patent: Jan. 20, 1987

[54] PORTABLE FLIR BEACON

[75] Inventors: Robert T. Hintz, China Lake; Roy L. Nichols, Ridgecrest, both of Calif.

[73] Assignee: The United States of America as represented by the Secretary of the Navy, Washington, D.C.

[21] Appl. No.: 895,407

[22] Filed: Apr. 10, 1978

[51] Int. Cl.⁴ .................... H04B 9/00; G02B 3/00
[52] U.S. Cl. ...................... 455/617; 350/1.2; 350/420; 350/436; 350/437; 455/609; 455/618
[58] Field of Search ............. 350/1.1, 1.2, 181, 190, 350/194, 98, 100, 420, 436, 437; 250/338, 341, 342, 199; 244/3.16, 3.13; 89/41 L; 356/152; 362/110-114, 259, 336; 455/609, 617, 618

[56] References Cited

U.S. PATENT DOCUMENTS

| 3,731,892 | 5/1973  | Cantella         | 244/3.16 |
| 3,778,007 | 12/1973 | Kearney, II et al. | 244/3.14 |
| 3,803,399 | 4/1974  | Smith et al.     | 362/259  |
| 3,953,667 | 4/1976  | Layton et al.    | 358/113  |
| 4,026,054 | 5/1977  | Snyder           | 42/1 A   |
| 4,040,744 | 8/1977  | Schertz et al.   | 250/342  |
| 4,091,412 | 5/1978  | Salonimer        | 250/199  |

FOREIGN PATENT DOCUMENTS

| 0053414 | 5/1966 | Fed. Rep. of Germany | 350/190 |
| 0953847 | 9/1947 | France               | 350/190 |

Primary Examiner—S. C. Buczinski
Attorney, Agent, or Firm—R. F. Beers; W. Thom Skeer

[57] ABSTRACT

An optical signal having construction and components and employing relatively long wavelength radiation. An aspheric lens and waveguide laser provide long range capability with low power requirements making battery operation practical.

8 Claims, 5 Drawing Figures

PORTABLE FLIR BEACON

BACKGROUND OF THE INVENTION

1. Field of the Invention

This invention pertains to the field of radiation, physics and pharology. More particularly, this invention pertains to an all-weather, signal system employing long wavelength coherent radiation. In still greater particularity, this invention concerns a portable optical signal by which a navigational beam and identification may be transmitted to remote observation points. By way of further characterization, but without limitation thereto, this invention will be described as it pertains to a infra-red signal to be used by ground forces to communicate with airplanes employing infra-red sensors.

2. Description of the Prior Art

In modern warfare it is essential that operational personnel of fast flying aircraft be able to locate friendly ground forces and other navigational points with a minimum of time and in a variety of weather conditions. Previous methods for achieving this identification employed the use of marker panels and flares.

Marker panels, although satisfactory in daytime operation, are limited by the visibility conditions and the time for identification.

Flares although capable of nighttime performance, sacrifice covert operation and therefor permit detection of the forces by hostile troops in the area.

Other prior art systems have used chemical fluorescence but such systems depend upon an active source within the approaching aircraft and may be obscured by vegetation and other ground objects such that their efficiency is largely limited to use in an water environment. Additionally, such systems require the use of chemicals which may be dangerous to personnel, and animal and plant life in the vicinity.

Although prior art systems using active illumination by the ground forces to indicate their position to approaching aircraft are known, these systems rely on inefficient light sources which require heavy power supplies and frequently have wavelengths which are diffused and absorbed by smoke, haze, clouds and other atmospheric foreign particles.

SUMMARY OF THE INVENTION

The invention employs a carbon dioxide waveguide laser which has an optical to power efficiency of approximately 10 times that of other portable light sources in the infrared region. The waveguide laser is combined with an optical system to provide a beam of radiation having fan shape which may be readily located by approaching aircraft. Although fan-shaped, the beam is sufficiently narrow in the vertical direction to prevent interception by other ground forces in the area. A lightweight battery and power supply, together with an anatomically shaped housing, permit a high degree of portability and accuracy of use by ground forces.

DESCRIPTION OF THE PREFERRED EMBODIMENT

Figure 1:
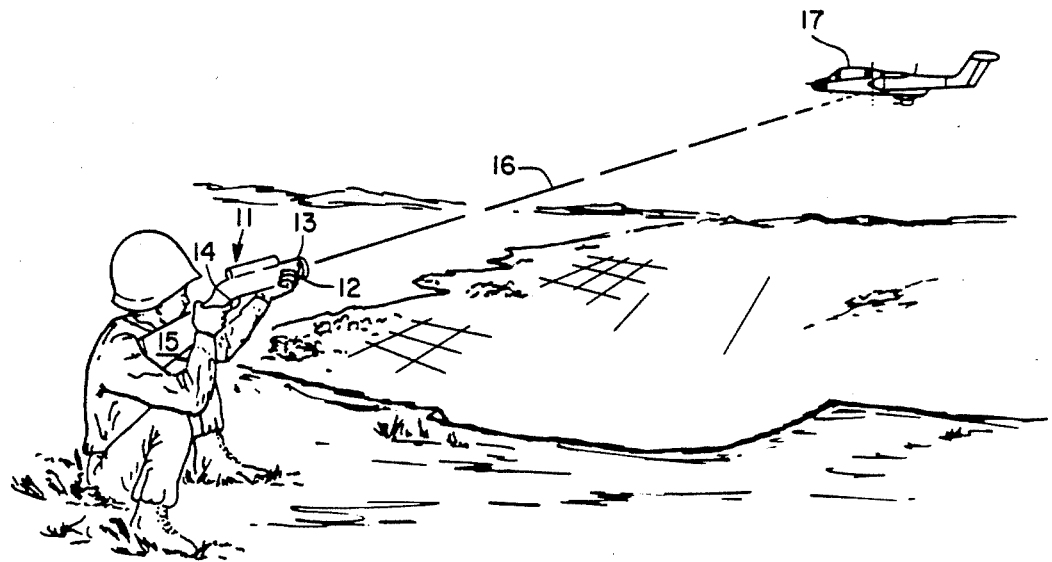
FIG. 1 shows the system of the invention in an operation environment.

FIG. 1 illustrates the portable signal system of the invention indicated at 11 having a housing 12 and having an optical sight 13 and a trigger switch 14 to permit selective operation of the system. Housing 12 is anatomically shaped to include a shoulder stock 15 by which operation personnel may support the signal system in a comfortable position and manipulate it to signal along a desired axis, indicated at 16, to an approaching aircraft 17.

In order to prevent detection by hostile forces, the output of the signal 11 is caused to be fan shaped such that it may be accurately aimed at the aircraft without illuminating enemy positions and have a wide enough angle in one dimension to permit easy acquisition by an aircraft in changing nose-up or nose-down attitude with a forward looking infra-red system mounted thereon. Of course, if desired, other beam patterns may be developed.

Figure 2:
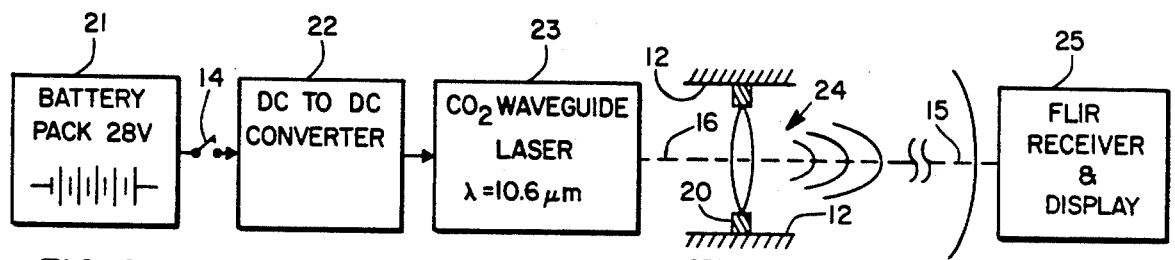
FIG. 2 is a diagrammatic view of the components comprising the signal of the invention.

Referring to FIG. 2, a battery power source indicated at 21 may conveniently be a 28 volt DC battery housed within shoulder stock 15 of housing 12. Trigger switch 14 connects the output of battery 21 to a DC-to-DC converter circuit 22 of conventional configuration. This circuit steps the 28 volt DC battery output up to approximately 10,000 volts necessary to operate a $CO_2$ waveguide laser 23 to which it is connected. Trigger switch 14 is shown positioned between battery 21 and DC-to-DC converter 22 but, of course, with standard engineering tradeoffs it may be placed in the circuit between DC-to-DC converter 22 and $CO_2$ waveguide laser 23. However, the switching of high DC voltages imposes design requirements that may be avoided with the illustrated configuration. The five-to-twelve micron output of $CO_2$ waveguide laser 23 is directed along an optical axis 16 to an optical system 24. Optical system 24 is held in an conventional optical cell 20 in housing 12 and establishes the output radiation path which directs the illumination to aircraft 17 and a forward looking infra-red, FLIR, receiver and display unit 25 carried therein. FLIR receiver and display 25 follow conventional design practices, well understood in the infra-red viewing arts.

The $CO_2$ waveguide laser is a conventional state-of-the-art unit such as that described by T. S. Fahlen in his article titled "$CO_2$ Laser Design Procedure", Applied Optics, Vol. 12, No. 10 (October 1973, at pages 2381-2390.) Such a laser confines the beam of lasing gas to a laser bore in which the electromagnetic field interacts intimately with the walls thereof. The lasing radiations produced by such a laser are described by Abrams & Bridges in "Characteristics of Sealed-Off Waveguide $CO_2$ Lasers" Industrial Electronics and Electronic Engineering, and Journal of Quantitative Electronics, Volume QE-9, No. 9 (September 1973). Such lasers have a very high power efficiency and output and additionally have a rigidity and ruggedness of construction that is ideal to field operational applications. The $CO_2$ waveguide lasers may be conveniently configured with an internal mirror structure. Such a construction mounts the optical elements of the resonator directly on a ceramic housing or envelope, such as an aluminum oxide or berillium oxide compositions and forms a laser discharge bore. Additionally, a reservoir of carbon dioxide gas may be included to communicate with the lasing bore. Thus, a relatively large supply of gas may be insured which improves the shelf life of such units. Additionally, the small size and light weight of these devices are ideally suited for the portable configuration of the present system.

Figure 3:
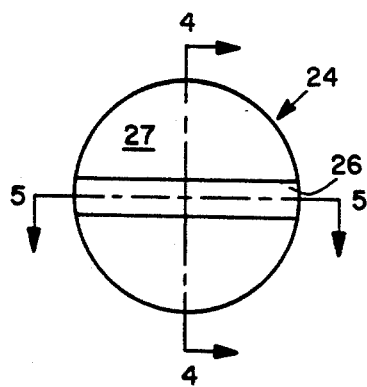
FIG. 3 is a front elevational view of the optical system used in the invention.
Figure 4:
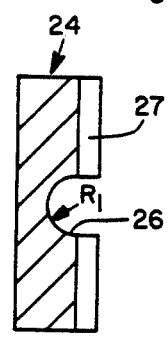
FIGS. 4 and 5 are sectional views taken along lines 4—4 and 5—5 of FIG. 3 respectively.
Figure 5:
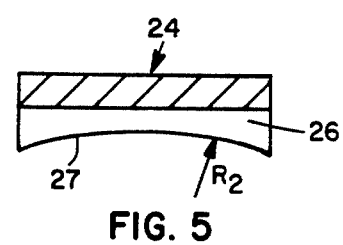

Referring to FIG. 3, the optical system used in developmental models of the invention to produce the desired beam width is illustrated. As shown, this optical system comprises a simple infra-red transmitting lens having two cylindrical surfaces. The first surface 26 extends transversely across the lens and has a sharp radius to provide a degree of dispersion required. In developmental models, lens 24 was of 6.35 milimeters in diameter and surface 26 had a radius of 1.13 milimeters. The larger radius surface 27 had a radius of curvature of 14.13 milimeters. The groove formed by surface 26 was truncated at a point to provide a surface width of 2 milimeters. Of course, the exact radius of curvature depends upon the index of refraction of the material from which lens 24 is made and the desired beam pattern.

In use, ground personnel are in voice communication with aircraft 17 by conventional electromagnetic communication systems and visually locate the aircraft 17 when it is in the operational area. The signal 11 is then shouldered and aimed at the aircraft and trigger switch 14 depressed.

When target acquisition has occured, the operator may release the trigger to extinguish the signal and prevent covert forces from locating its position. Or, conversely, trigger switch 14 may be used to modulate the laser output into a pulsed signal which may be used by operational personnel in aircraft 17 to facilitate identification and location. Optical sight 13 facilitates this aiming and may be, in developmental models, an optical rifle scope of conventional construction.

The foregoing description taking together with the appended claims constitute the disclosure such as to enable persons skilled in the electronics and optical arts and having the benefits of the teachings contained therein to make and use the invention. Further, the structure herein described generally constitutes a meritorious advance in the art unobvious to such an artisan not having the benefit of these teachings.

What is claimed is:

1. A radiant energy signal system comprising:

a portable housing configured for manual manipulation to a predetermined spatial orientation with respect to an operator thereof for aiming said signal system;

a source of electrical energy mounted within said portable housing;

an electro-optical transducer means mounted within said portable housing and effectively connected to said source of electrical energy for producing a radiant energy signal having a wavelength within the eight-to-twelve micron range; and an optical element effectively mounted within said housing and in optical alignment with said electro-optical transducer means and configured to have two cylindrical concave surfaces of different radii with axes at right angles and on the same surface thereof to direct said radiant energy into a fan shaped beam which with said predetermined spatial orientation causes said radiant energy signal to impinge a desired receptor.

2. A signal system according to claim 1 wherein said portable housing is anatomically shaped to facilitate shoulder support while being manipulated.

3. A signal system according to claim 1 further including sight means attached to said housing for facilitating directing said signal to remote points.

4. A signal system according to claim 3 wherein said sight means includes an optical sight attached to said housing and positioned to facilitate aiming by a person holding said housing in a shoulder supported position.

5. A signal system according to claim 1 in which said source of electrical energy includes switch means for effecting said connection to said electro-optical transducer.

6. A signal system according to claim 4 further including a manually operated switch positioned to be finger operated by a user holding the aforesaid portable housing in a shoulder supported position and electrically connected to said source of electrical power to complete the effective connection to said electro-optical transducer.

7. A signal system according to claim 1 wherein said electro-optical transducer is a carbon dioxide waveguide laser.

8. A signal system according to claim 6 wherein the aforesaid electro-optical laser is a carbon dioxide laser.

* * * * *